(12) United States Patent
Pogodin et al.

(10) Patent No.: US 9,531,794 B2
(45) Date of Patent: *Dec. 27, 2016

(54) SYSTEM AND METHOD FOR PLAYING WEB-BASED TRAINING CONTENT ON A CLIENT COMPUTER SYSTEM

(71) Applicant: Saba Software, Inc., Redwood Shores, CA (US)

(72) Inventors: Andrey Pogodin, San Mateo, CA (US); Roshini Unni, Redwood City, CA (US); Land Ormiston, San Francisco, CA (US)

(73) Assignee: Saba Software, Inc., Redwood Shores, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/242,511

(22) Filed: Apr. 1, 2014

(65) Prior Publication Data

US 2014/0330882 A1    Nov. 6, 2014

Related U.S. Application Data

(63) Continuation of application No. 11/499,138, filed on Aug. 3, 2006, now Pat. No. 8,684,748.

(60) Provisional application No. 60/741,275, filed on Nov. 30, 2005.

(51) Int. Cl.
| | | |
|---|---|---|
| *G09B 7/00* | (2006.01) | |
| *H04L 29/08* | (2006.01) | |
| *G09B 7/04* | (2006.01) | |
| *G09B 7/02* | (2006.01) | |
| *G09B 19/00* | (2006.01) | |
| *G06F 17/30* | (2006.01) | |

(52) U.S. Cl.
CPC .......... *H04L 67/10* (2013.01); *G06F 17/30312* (2013.01); *G09B 7/02* (2013.01); *G09B 7/04* (2013.01); *G09B 19/0053* (2013.01)

(58) Field of Classification Search
CPC ............. G09B 7/00; G09B 7/04; G09B 7/077; G09B 7/08; H04L 67/10; G06F 17/30312
See application file for complete search history.

(56) References Cited

U.S. PATENT DOCUMENTS

| | | |
|---|---|---|
| 6,654,748 B1 | 11/2003 | Rabung et al. |
| 6,688,891 B1 | 2/2004 | Sanford |
| 7,044,741 B2 | 5/2006 | Leem |
| 7,153,137 B2 | 12/2006 | Altenhofen et al. |
| 8,260,656 B1 | 9/2012 | Harbick et al. |
| 8,554,129 B2 | 10/2013 | Timbadia et al. |
| 2003/0232318 A1 | 12/2003 | Altenhofen et al. |

(Continued)

*Primary Examiner* — Peter Egloff

(57) ABSTRACT

A method and system for playing web-based training content on a client computer system are provided. The method includes accessing previously downloaded web-based training content stored in a first memory coupled to the client computer system and playing a portion of the web-based training content on the client computer system while the client computer system is offline. The method further includes storing results associated with playing the portion of the web-based training content in a second memory coupled to the client computer system. The method further includes, in response to detecting the client is online, synchronizing results of the playing with a host computer system.

20 Claims, 6 Drawing Sheets

(56) References Cited

U.S. PATENT DOCUMENTS

2005/0026131 A1\* 2/2005 Elzinga .................. G09B 7/00
                                                            434/365
2005/0053908 A1   3/2005 Satheesh et al.
2005/0136388 A1   6/2005 de Saint-Aignan et al.

\* cited by examiner

SYSTEM AND METHOD FOR PLAYING WEB-BASED TRAINING CONTENT ON A CLIENT COMPUTER SYSTEM

RELATED U.S. PATENT APPLICATIONS

This patent application is a continuation of the copending U.S. patent application with Ser. No. 11/499,138, filed on Aug. 3, 2006, entitled "A System and Method for Playing Web-Based Training Content on a Client Computer System" by Pogodin et al., now U.S. Pat. No. 8,684,748, which in turn claims the benefit of U.S. Provisional Application No. 60/741,275, filed on Nov. 30, 2005, entitled "SCORM-Based Offline Player," by Pogodin et al., both of which are hereby incorporated by reference in their entirety.

TECHNICAL FIELD

The present invention is related to the field of learning management systems (LMS). More particularly, embodiments of the present invention are related to a web-based training (WBT) system including a Sharable Courseware Object Reference Model (SCORM) based offline player.

BACKGROUND ART

In early stages, computer-based training (CBT) was delivered from a large central computer to thin-client terminals. This implementation required that users of the CBT come to a learning center (or test center) to use the CBT which proved inconvenient for many users.

In recent years, CBT has been offered offline, typically using CD-ROMS or other portable data storage devices to provide the content of the training. Offering CBT offline (and/or away from a dedicated test center), allowed training content to be delivered to the user and allowed the user to access the material at his/her own pace and location. Furthermore, offline CBT can utilize the full multimedia functionality, including animation, sound and video of the user's computer system which further enhanced the user's experience. Some problems with offline CBT include difficulties updating course material, reporting of user's scores, updating user's transcripts, costs of supplying materials, etc.

To overcome many of the problems associated with offline training, web-based training was developed. Web-based training is distributed online over an intranet or the world-wide-web and can be run in a web browser, for example. When first implemented, a proprietary learning management system was used to launch each of the different WBT programs.

Sharable Courseware Object Reference Model (SCORM) is a standard that is implemented by a LMS that can launch compatible learning content, keep track of learner progress, determines sequence of learning objects and reports user scores. Using the SCORM standard significantly streamlined WBT because it eliminated the need for storing multiple proprietary LMS on a user's computer.

SCORM-based WBT may be problematic in cases when a user is not connected to a network (e.g., when on a plane) because delivery of updates and reporting of user data cannot be performed offline.

SUMMARY

A method for playing web-based training content on a client computer system is provided. The method includes accessing previously downloaded web-based training content stored in a first memory coupled to the client computer system and playing a portion of the web-based training content on the client computer system while the client computer system is offline. The method further includes storing results associated with playing the portion of the web-based training content in a second memory coupled to the client computer system. The method further includes, in response to detecting the client is online, synchronizing results of the playing with a host computer system.

More specifically, an embodiment of the present invention is directed to a computer implemented method of playing web-based training content on a client computer system comprising: accessing previously downloaded web-based training content stored in a first memory coupled to the client computer system; playing a portion of the web-based training content on the client computer system while the client computer system is offline; and storing results associated with playing the portion of the web-based training content in a second memory coupled to the client computer system. Embodiments also include the above and further comprising: in response to detecting the client is online, synchronizing results of the playing with a host computer system and updating a training transcript associated with the client.

Embodiments also include a system for offline web-based training comprising: a generic training content player for playing web-based training content on a client computer system while the client computer system is offline; a downloader for downloading web-based training content and storing the web-based content in a first memory coupled to a client computer system; an off-line play handler for storing results associated with playing off-line a portion of the web-based training content in a second memory coupled to the client computer system; and an uploader for uploading the results associated with playing off-line a portion of the web-based training content to a host computer system in response to detecting a connection between the client computer system and the host computer system.

Embodiments include the above system and wherein the downloader automatically downloads updates to the generic training content player in response to detecting the connection between the client computer system and the host computer system. Embodiments also include the above system and wherein the downloader automatically downloads new web-based training content in response to detecting the connection between the client computer system and the host computer system. Embodiments also include the above system and wherein the downloader automatically downloads a play pattern for subsequent training based on the results in response to detecting the connection between the client computer system and the host computer system.

Embodiments are also directed to a computer implemented method for offline web-based training comprising: distributing an offline content player to a client computer system from a host computer system; distributing web-based training content to the client computer system from the host computer system; and receiving off-line play results from the client computer system in response to the client computer system connecting to the host computer system. Embodiments include the above and further comprising: automatically distributing updates to the web-based training content in response to the play results.

Embodiments include the above and wherein the web-based training content is substantially Sharable Courseware Object Reference Model (SCORM) compatible and wherein the offline content player is generic and compatible with a plurality of web-based content. Embodiments include the above and further comprising determining a subsequent play pattern of the web-based content based on the play results.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Embodiments of the present invention provide an exemplary web-based training (WBT) content player for playing WBT content while a client computer system is offline. In one embodiment of the invention, the exemplary off-line player is generic and is compatible with various forms web-based training content formats as long as they are provided in a SCORM package format.

Figure 1:
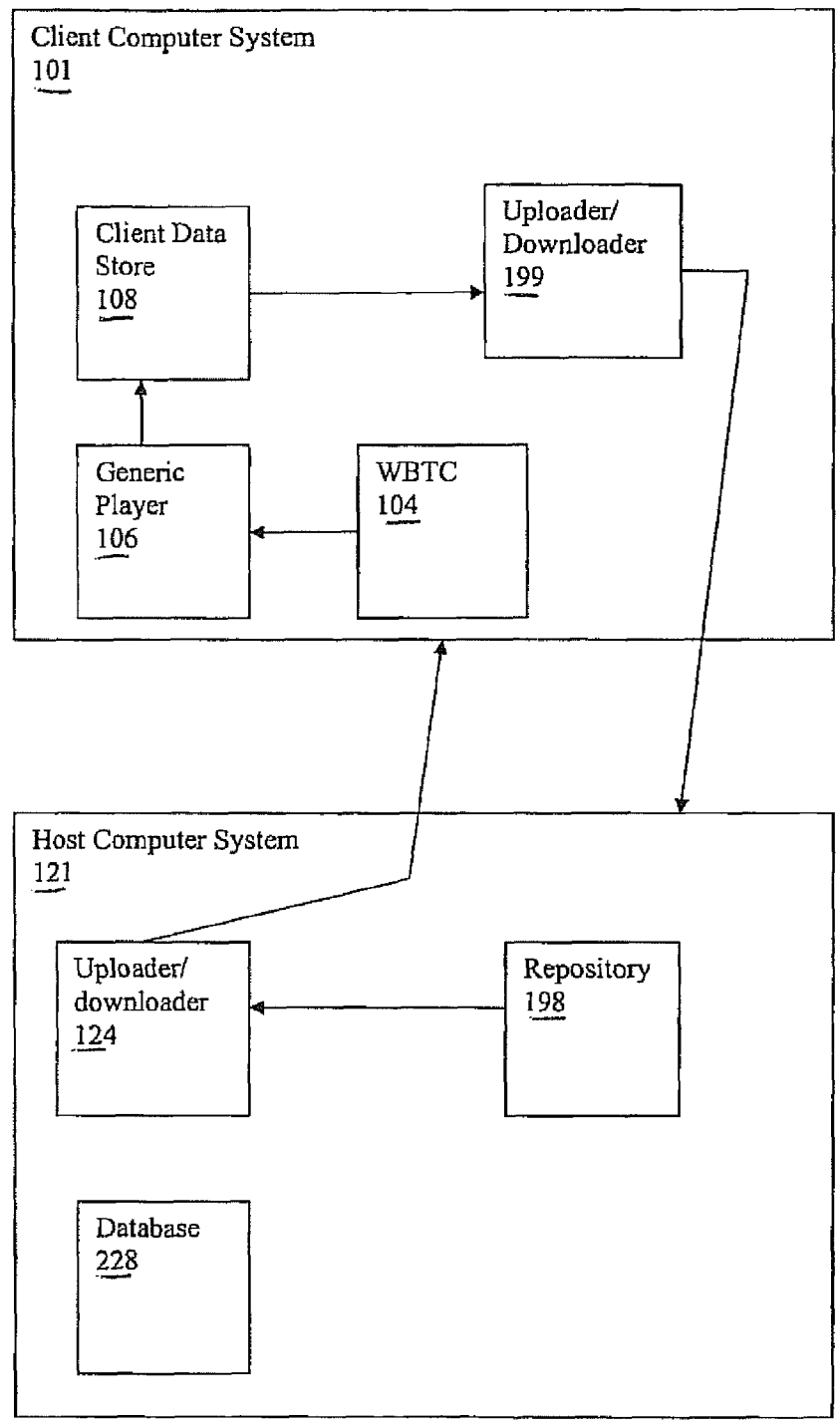
FIG. 1 is a block diagram of an exemplary system for web-based training in accordance with one embodiment of the present invention.

FIG. 1 is a block diagram of an exemplary system 100 for web-based training in accordance with one embodiment of the present invention. In one embodiment of the invention, the client computer system 101 can play web-based training content (WBTC) 104 while the client computer system 101 is off-line. In one embodiment of the invention, off-line means the client computer system 101 does not have communication with the host computer system 121. In one embodiment of the invention, the client computer system 101 can make a connection with the host computer system 121 over the Internet. However, it is appreciated that the client computer system could make a connection with the host computer system 121 in any number of ways over any number of communications media.

The client computer system 101 comprises a generic player 106 for playing the WBTC 104. In one embodiment of the invention, the generic player 106 is Sharable Courseware Object Reference Model (SCORM) compatible. In one embodiment of the invention, the client uploader/downloader 199 downloads the generic player 106 from the host computer system 121. The generic player 106 can play the WBTC while the client computer system 101 is on-line (e.g., a connection exists between the client computer system 101 and the host computer system 121) or while the client computer system 101 is off-line (e.g., a connection does not exist between the client computer system 101 and the host computer system 121). In one embodiment of the invention, the generic player operates within a Windows-based application environment.

In one embodiment of the invention, in the case a client computer system is off-line, the generic player 106 stores play results in a client data store 108. Client data store 108 can be a cache memory or any other memory device communicatively coupled to the client computer system 101. In one embodiment of the invention, play results include content played, time of play, length of play, correct answers, incorrect answers or any other play metric in accordance with embodiments of the present invention. In the case the client computer system is on-line, the play results could be stored in client data store 108 or can be directly sent to the host computer system 121.

In one embodiment of the invention, in response to detecting a connection between the client computer system 101 and the host computer system 121, the client computer system can upload the stored user play data from user data store 108 to the uploader/downloader 124 of the host computer system 121. In response to receiving the off-line play data, the host computer system 121 updates a database 228. In one embodiment of the invention, the client data comprises transcript-like information such as test scores, content completed, time spent, completion status, client objectives, or any other information associated with a particular client. In one embodiment of the invention, the host computer system 121 comprises a repository 198 for storing content such as the generic player 106 and WBTC 104 which can be uploaded to the client computer system 101.

Figure 2:
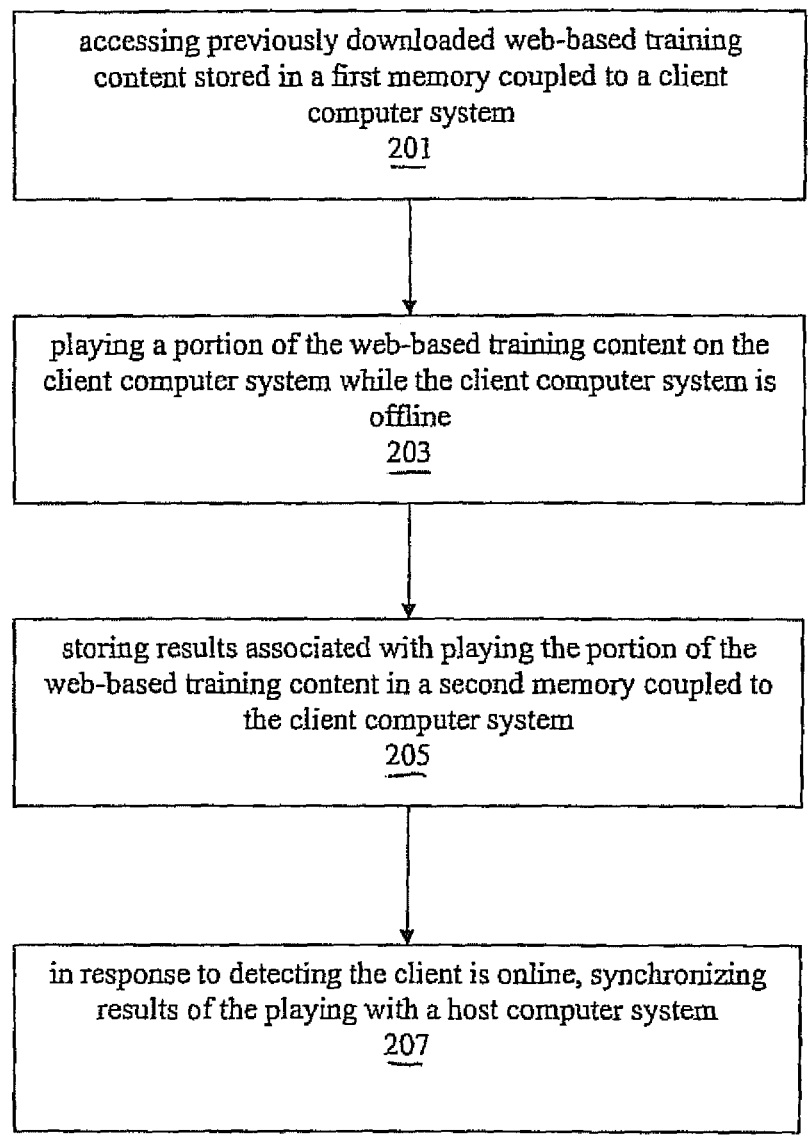
FIG. 2 is a flow diagram of an exemplary method for playing web-based training content on a client computer system in accordance with embodiments of the present invention.

FIG. 2 is a flow diagram of an exemplary computer implemented method 200 for playing web-based training content on a client computer system in accordance with embodiments of the present invention. At step 201, method 200 includes accessing previously downloaded web-based training content stored in a first memory coupled to a client computer system. It is appreciated that the training content can be loaded to the client computer system in any number of ways, for example with a CD-ROM or other portable data storage device.

At step 203, method 200 includes playing a portion of the web-based training content on the client computer system while the client computer system is off-line. For example, the client computer system is on an airplane or automobile, etc., where a connection to the host computer may not be available.

At step 205, method 200 includes storing results associated with playing the WBT content off-line in a memory device coupled to the client computer system. In one embodiment of the invention, the off-line play information is stored on the client computer system until the client computer system can connect with the host computer system.

At step 207, method 200 includes in response to detecting the client is online (e.g., a connection exists between the client computer system and the host computer system), synchronizing results of the off-line play with the host computer system. In one embodiment of the invention, the host computer system updates a client profile (e.g., an electronic transcript) with the client's play performance (e.g., test results, content played, time spent, etc.).

Figure 3:
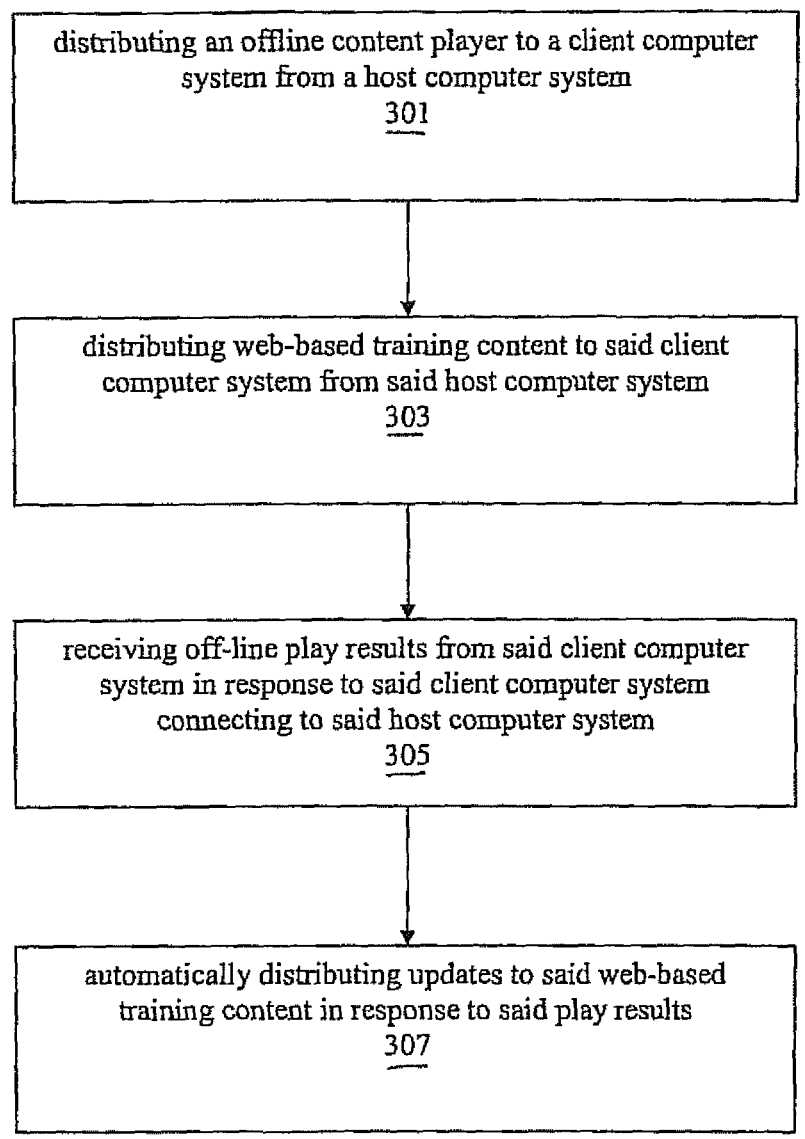
FIG. 3 is a flow diagram of an exemplary method for off-line web-based training from a host side in accordance with embodiments of the present invention.

FIG. 3 is a flow diagram of an exemplary computer controlled method 300 for off-line web-based training from a host side in accordance with embodiments of the present invention. At step 301, method 300 includes distributing an offline content player to a client computer system from a host computer system. In one embodiment of the invention, a client computer system performs a one-time download of the off-line player and installs the player on the client computer system. In one embodiment of the invention, a client computer system uses a web browser program to access a download web page. The download web page comprises a link pointing to the off-line content player.

In one embodiment of the invention, when the host computer downloads the WBTC to the client computer, the host computer system adds a unique file to the download package that can be used for uniquely identifying the user. The unique file facilitates result reporting and content display in the off-line player. In one embodiment of the invention, the unique file comprises XML and may also include subscription information such as download date, user local information, callback URL, user time zone, etc.

Figure 4:
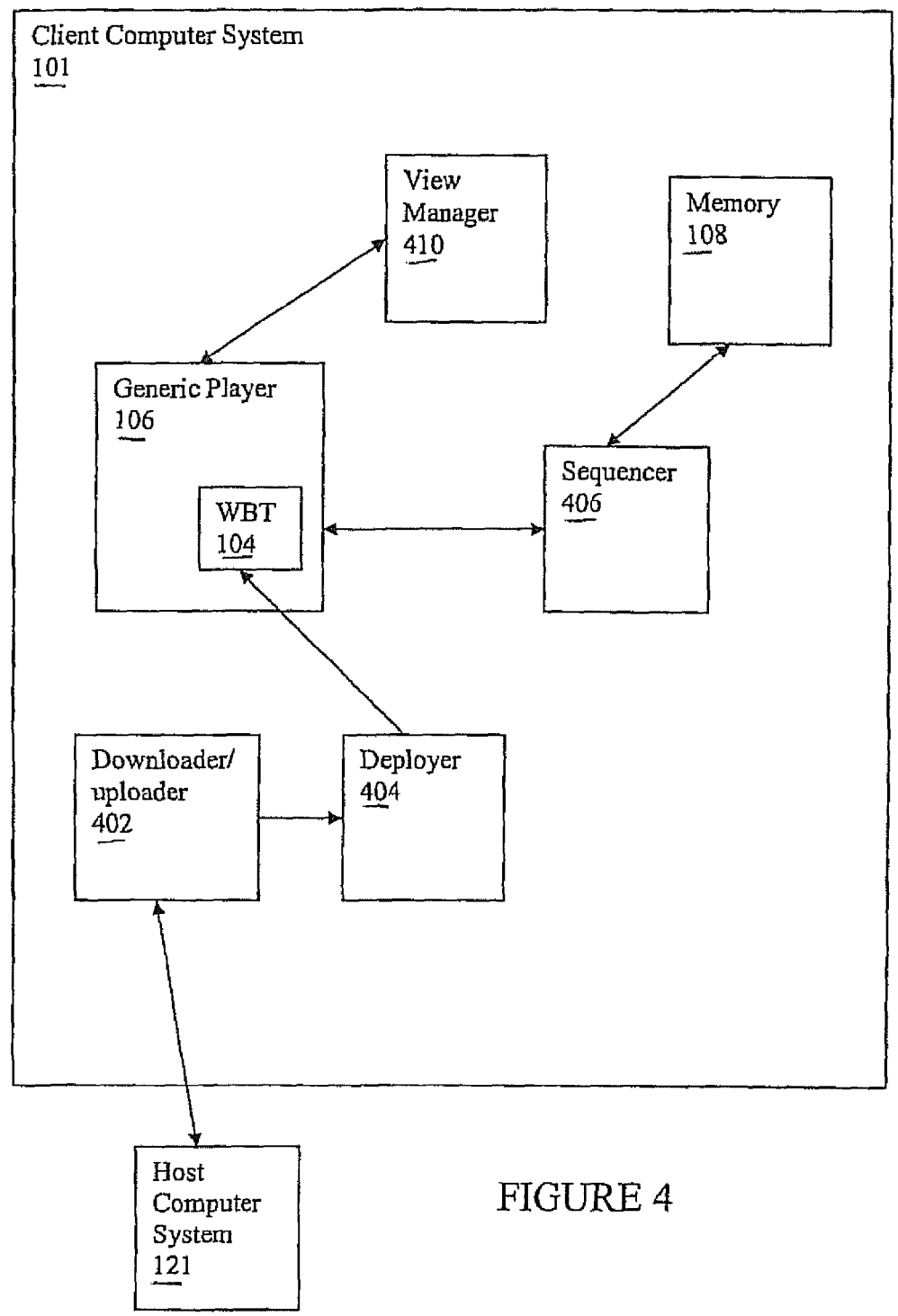
FIG. 4 is a block diagram of an exemplary client computer system for playing web-based training content while off-line in accordance with embodiments of the present invention.

FIG. 4 is a block diagram of an exemplary client computer system 101 for playing web-based training content while off-line in accordance with embodiments of the present invention. It is appreciated that the components of the client computer system may be part of the package initially downloaded to the client computer system from the host computer system. In one embodiment of the invention, the client computer system comprises a generic player 106 from the host computer system 121 and an uploader for uploading information (e.g., client off-line play results) to the host computer system 121.

In one embodiment of the invention, a deployer module 404 is responsible for importing content into the player 106 and for deleting content from the player 106. The player 106 is the module responsible for playing WBTC 104. In one embodiment of the invention, the player 106 is SCORM-based and can play a plurality of WBTC as long as it is provided in a SCORM package format. The player 106 calls the sequencer module 406 to get the next portion of content to display. The player 106 also calls the view manager 410 to appropriately set up user interface controls.

The sequencer module 406 is responsible for determining which portion of the WBTC 104 to display. In one embodiment of the invention, the sequencer is "smart" and makes decisions based on performance metrics associated with the user. In one embodiment of the invention, the sequencer 406 also determines what navigation icons are displayed on a toolbar associated with the player 106. In one embodiment of the invention, the sequencer 406 communicates this information to the view manager 410.

After off-line play and a connection is made between the client computer system 101 and the host computer system 121, off-line play results are uploaded from the memory 108 to the host computer system 121. In one embodiment of the invention, the sequencer module 406 comprises a synchronizer module (not shown) for synchronizing client data with the host computer system 121. In one embodiment of the invention, the client data comprises registration information and off-line play performance data (e.g., test results, content played, time spent, etc.), but could include any information associated with the client computer system 101.

In one embodiment of the invention, upon completion or failure of the result synchronization process, the synchronizer displays a localized success or error message. The synchronizer may generate a precise message for a variety of outcomes such as disconnection from the host, unreachable IP address, unknown host, etc.

Figure 5:
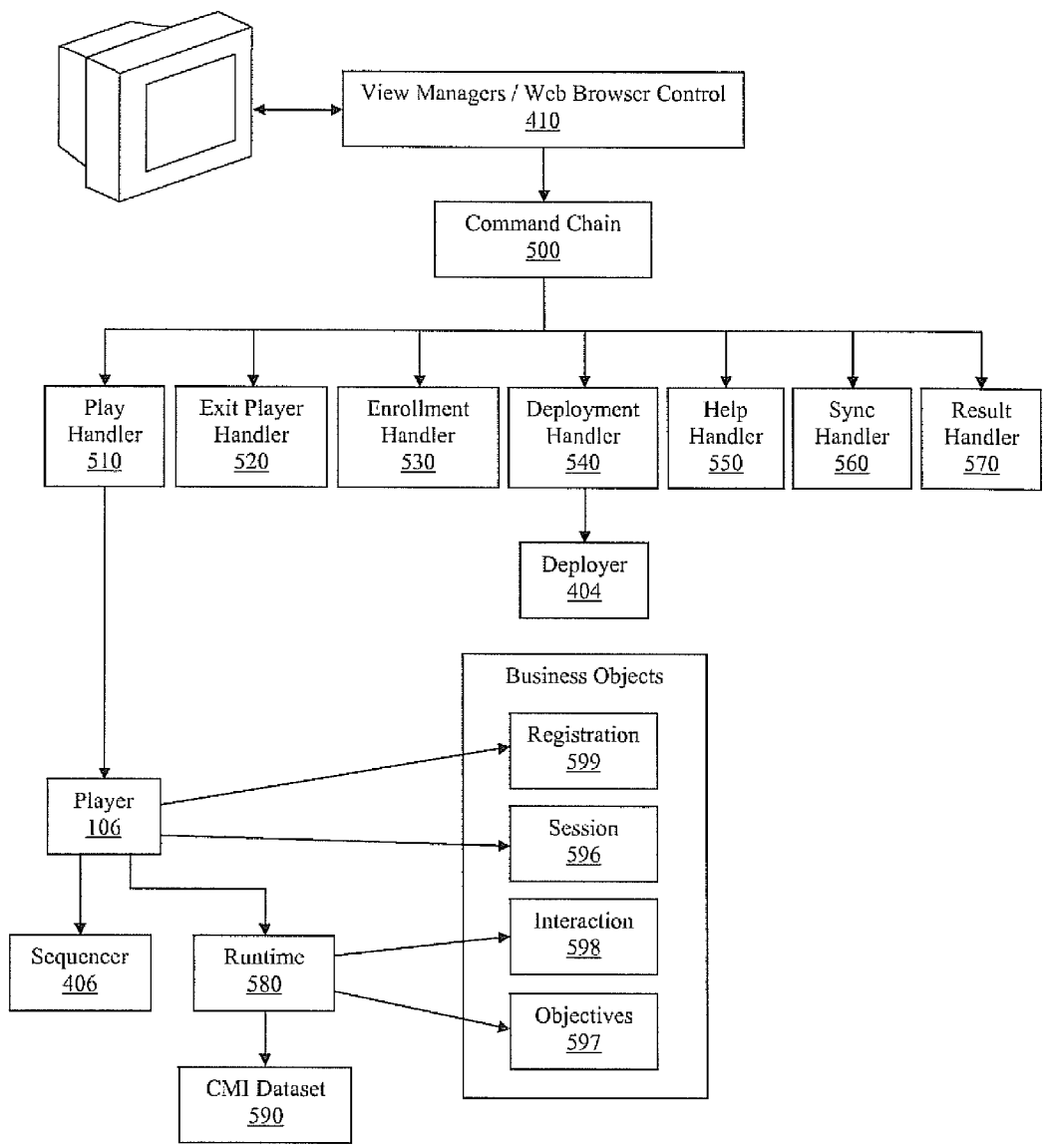
FIG. 5 is a block diagram of an exemplary system for off-line play of web-based training content including an exemplary command chain in accordance with embodiments of the present invention.

FIG. 5 is a block diagram of an exemplary system for off-line play of web-based training content including an exemplary command chain in accordance with embodiments of the present invention. In one embodiment of the invention, all user interface commands made through the view manager/web browser control 410 are sent through the command chain 500. In one embodiment of the invention, the command chain 500 includes a plurality of command handlers, each responsible for one or more commands.

The play handler 510 is responsible for playing web-based content. The exit play handler 520 is responsible for handling the event of closing the player. The enrollment handler 530 is responsible for displaying an aggregate view of all WBTC that has been downloaded and imported. In one embodiment of the invention, the enrollment view is a user interface that allows a user to view all WBTC that has been downloaded and imported and play, synchronize, or delete the content.

The deployment handler 540 handles the event of importing a package into the player and deleting a package from the player. The deployment handler 540 communicates with the deployer 404 to import/export content into the player.

The help handler 550 handles help and about menu items. The sync handler 560 handles the event of synchronization with the host computer system. The result handler handles viewing of results.

In one embodiment of the invention, the player 106 calls the sequencer 406 to get the next item to display. The runtime 580 is responsible for handling requests from the player 106 to log play results in the dataset 590. The player 106 accesses business objects 595 to determine registration information 599 and session data 595. The runtime 580 accesses business objects 595 to determine interaction information 598 and objectives 597.

Figure 6:
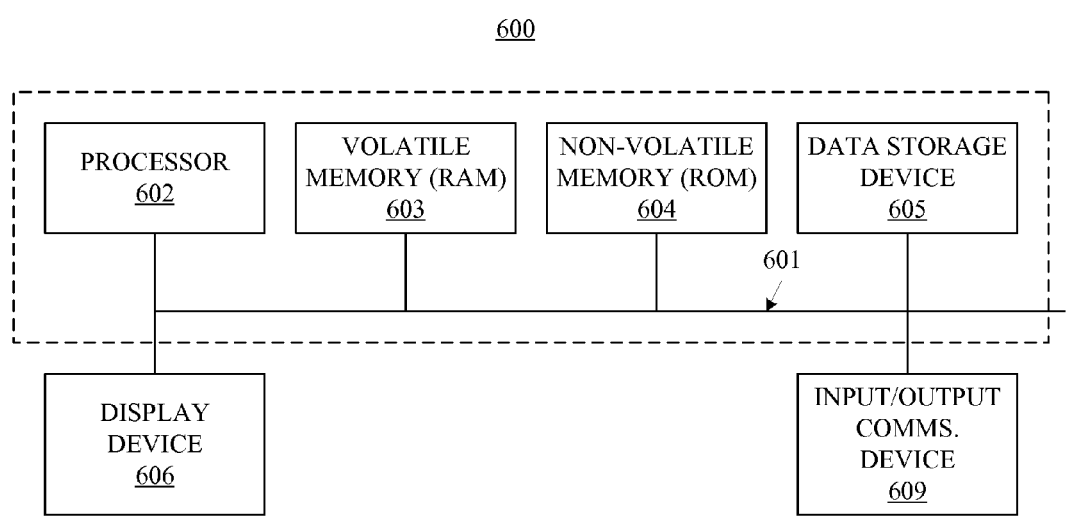
FIG. 6 is a block diagram of an exemplary computer system in accordance with embodiments of the present invention.

Referring now to FIG. 6, a block diagram of exemplary computer system 600 is shown. It is appreciated that computer system 600 of FIG. 6 described herein illustrates an exemplary configuration of an operational platform upon which embodiments of the present invention can be implemented. For example, computer system 600 may be similar to the exemplary client computer system 101 of FIG. 1 and/or similar to the host computer system 121 of FIG. 1. Nevertheless, other computer systems with differing configurations can also be used in place of computer system 600 within the scope of the present invention. For example, computer system 600 could be a server system (e.g., host computer system 121), a node on a network, a personal computer (e.g., client computer system 101) or an embedded computer system such as a mobile telephone or pager system. Furthermore, computer system 600 could be a multiprocessor computer system.

Computer system 600 includes an address/data bus 601 for communicating information, a central processor 602 coupled with bus 601 for processing information and instructions, a volatile memory unit 603 (e.g., random access memory, static RAM, dynamic RAM, etc.) coupled with bus 601 for storing information and instructions for central processor 602 and a non-volatile memory unit 604 (e.g., read only memory, programmable ROM, flash memory, EPROM, EEPROM, etc.) coupled with bus 601 for storing static information and instructions for processor 602. Computer system 600 may also contain an optional display device 606 coupled to bus 601 for displaying information to the computer user. Moreover, computer system 600 also includes a data storage device 605 (e.g., disk drive) for storing information and instructions.

Implementation Details

The following are examples of various data formats in accordance with embodiments of the present invention. It is appreciated that the following are exemplary and it is appreciated that any number of data formats can be used in accordance with embodiments of the present invention.

The following is an example of an exemplary data file containing data necessary for result reporting and content display in offline player. The file could be an XML document containing the following data:

1) Context ID—(This is the id of the context object. The context in which the content is accessed by the user. It encapsulates the user and the source from which s/he gets the access to the content.)
2) Subscription ID—(This is the id of the subscription object. Subscription defines the process of subscribing to a content. This object holds information about the content and the subscriber.)
3) Content_name—(Localized subscriber object name)
4) Owner_id—(id of the content inventory)
5) Owner_name—(name of the content inventory)
6) Learner_saba_id—(id of the learner who has downloaded the content)
7) Downloaded_on—(date/time when the content package was downloaded)
8) Culture—(locale information of the user)
9) runtime_data_learner_id—(unique identifier for the learner)
10) runtime_date_learner_name—(Full name (first name and last name) of the learner)
11) Callback URL—(This URL is used to synchronize results of a particular content package with Saba)

In one embodiment of the invention, the file could be encoded in UTF-8 format, but any format could be used.

Table I illustrates an exemplary format of the file in accordance with an embodiment of the present invention:

TABLE I

```
<?xml version="1.0" encoding="UTF-8"?>
<sabaini>
    <context_id>ctctx000000000001455</context_id>
    <subscription_id>ctnsr000000000001280</subscription_id>
    <content_name>content1</content_name>
    <owner>
        <id>cninv000000000001080</id>
        <name>content1</name>
        <part_no/>
    </owner>
    <learner_saba_id>emplo000000000001000</learner_saba_id>
    <downloaded_on>1099180513421<downloaded_on>
    <culture>en_US</culture>
    <runtime_data>
        <learner_id>uone</learner_id>
        <learner_name>User One</learner_name>
    </runtime_data>
    <callback_url>http://runni:80/Saba/AICCReporter?aiccSessionKey=dcert31303
866336338643539625E235E756F6E655E235E53616261536974655E235E656E5
F55535E235E536162615E235E53414241302C021427293F991416C9A57D119E
19C82CE10A8F3CD44202145AE9C8681AB1E40EAFE4EI2E02312970498C0
EFD-
content/cmiHACP.saba&session_id=cninv000000000001455&userId=u
one&content-type=SabaOffline
    </callback_url>
</sabaini>
```

Table II illustrates one example of an exemplary URL used to report results back to the LMS in accordance with embodiments of the present invention:

TABLE II

Table II is a sample Callback URL which is used while synchronizing results with Saba. It contains the following information:
  1) id of the content inventory,
  2) user id
  3) type of content (which would be Offline)
  4) certificate which contains authentication info to be able to login to Saba Application
  5) encoded results information
http://runni/Saba/AICCReporter?
session_id=cninv000000000001455
&userId=uone
&content-type=SabaOffline
&certificate=dcert31303866336338643539625E235E756F6E655E235E53616261536974
655E235E656E5F55535E235E536162615E235E53414241302C021427293F991416C9A TABLE II-continued

```
57D119E19C82CE10A8F3CD44202145AE9C8681AB1E40EAFE4E12E02312970498C
0EFD
&data= [encoded CMI data]
```

Table III illustrates one example of exemplary HTTP contents of a response from the host side (XML datagram & embedded XML schema) in accordance with an embodiment of the present invention:

TABLE III

```
"<?xml version="1.0" encoding="UTF-8"?>
<NewDataSet>
    <xs:schema xmlns:msdata="urn:schemas-microsoft-com:xml-msdata"
xmlns:xs="http://www.w3.org/2001/XMLSchema" id="NewDataSet" xmlns="">
        <xs:element msdata:IsDataSet="true" name="NewDataSet">
            <xs:complexType>
                <xs:choice maxOccurs="unbounded">
                    <xs:element name="id_table">
                        <xs:complexType>
                            <xs:sequence>
                                <xs:element name="ID" type="xs:string"/>
                                <xs:element name="TABLE_NAME" type="xs:string"/>
                                <xs:element name="LASTID" type="xs:long"/>
                            </xs:sequence>
                        </xs:complexType>
                    </xs:element>
                    <xs:element name="cnt_cmi_owner">
                        <xs:complexType>
                            <xs:sequence>
                                <xs:element name="ID" type="xs:string"/>
                                <xs:element name="NAME" type="xs:string"/>
                                <xs:element name="PART_NO" type="xs:string"/>
                                <xs:element default="false" minOccurs="0" name="IS_SYNCHRONIZED" type="xs:string"/>
                                <xs:element default="0" minOccurs="0" name="LAST_SYNCHRONIZED_ON" type="xs:long"/>
                                <xs: element default="null_value_rnd_213211223211221213123123" minOccurs="0" name="SABA_OBJECT_ID" type="xs:string"/>
                                <xs:element default="0" minOccurs="0" name="CREATED_ON" type="xs:long"/>
                                <xs:element default="0" minOccurs="0" name="UPDATED_ON" type="xs:long"/>
                            </xs:sequence>
                        </xs:complexType>
                    </xs:element>
                    <xs:element name="cnt_cmi_package">
                        <xs:complexType>
                            <xs:sequence>
                                <xs:element name="ID" type="xs:string"/>
                                <xs:element name="OWNER_ID" type="xs:string"/>
                                <xs:element name="EMPLOYEE_SABA_ID" type="xs:string"/>
                                <xs:element name="EMPLOYEE_USERNAME" type="xs:string"/>
                                <xs:element name="EMPLOYEE_FULL_NAME" type="xs:string"/>
                                <xs: element name="EMPLOYEE_CULTURE" type="xs:string"/>
                                <xs:element name="CONTEXT_ID" type="xs:string"/>
                                <xs:element name="SUBSCRIPTION_ID" type="xs:string"/>
                                <xs:element minOccurs="0" name="REGISTRATION_ID" type="xs:string"/>
                                <xs:element minOccurs="0" name="NAME" type="xs:string"/>
                                <xs:element minOccurs="0" name="DOWNLOADED_ON" type="xs:string"/>
                                <xs:element minOccurs="0"
```

TABLE III-continued

```
name="FOLDER" type="xs:string"/>
            <xs:element minOccurs="0"
name="CALLBACK_URL" type="xs:string"/>
            <xs:element default="false"
minOccurs="0" name="IS_SYNCHRONIZED" type="xs:string"/>
            <xs:element default="0"
minOccurs="0" name="LAST_SYNCHRONIZED_ON" type="xs:long"/>
            <xs:element
default="null_value_rnd_213211223211221213123123" minOccurs="0"
name="SABA_OBJECT_ID" type="xs:string"/>
            <xs:element default="0"
minOccurs="0" name="CREATED_ON" type="xs:long"/>
            <xs:element default="0"
minOccurs="0" name="UPDATED_ON" type="xs:long"/>
          </xs:sequence>
        </xs:complexType>
      </xs:element>
      <xs:element name="cnt_cmi_registration">
        <xs:complexType>
          <xs:sequence>
            <xs:element name="ID"
type="xs:string"/>
            <xs:element
name="PACKAGE_ID" type="xs:string"/>
            <xs:element
name="ACTIVITY_ID" type="xs:string"/>
            <xs:element
name="LESSON_STATUS" type="xs:string"/>
            <xs:element
name="CREDIT" type="xs:string"/>
            <xs:element
name="ENTRY" type="xs:string"/>
            <xs:element name="EXIT"
type="xs: string"/>
            <xs:element minOccurs="0"
name="LOCATION" type="xs:string"/>
            <xs:element name="MODE"
type="xs:string"/>
            <xs:element minOccurs="0"
name="SUSPEND_DATA" type="xs:string"/>
            <xs:element
name="TOTAL_TIME" type="xs:string"/>
            <xs:element minOccurs="0"
name="SCORE_RAW" type="xs:string"/>
            <xs:element minOccurs="0"
name="SCORE_MAX" type="xs:string"/>
            <xs:element minOccurs="0"
name="SCORE_MIN" type="xs:string"/>
            <xs:element default="0"
name="TOTAL_ATTEMPTS" type="xs:long"/>
            <xs:element default="false"
minOccurs="0" name="IS_SYNCHRONIZED" type="xs:string"/>
            <xs:element default="0"
minOccurs="0" name="LAST_SYNCHRONIZED_ON" type="xs:long"/>
            <xs:element
default="null_value_rnd_213211223211221213123123" minOccurs="0"
name="SABA_OBJECT_ID" type="xs:string"/>
            <xs:element default="0"
minOccurs="0" name="CREATED_ON" type="xs:long"/>
            <xs:element default="0"
minOccurs="0" name="UPDATED_ON" type="xs:long">
          </xs:sequence>
        </xs:complexType>
      </xs:element>
      <xs:element name="cnt_cmi_session">
        <xs:complexType>
          <xs:sequence>
            <xs:element name="ID"
type="xs:string"/>
            <xs:element minOccurs="0"
name="REGISTRATION_ID" type="xs:string"/>
            <xs:element
name="ATTEMPT_NUMBER" type="xs:long"/>
            <xs:element
name="LESSON_STATUS" type="xs:string"/>
            <xs:element name="TIME"
type="xs:string"/>
            <xs:element minOccurs="0"
name="SCORE_RAW" type="xs:string"/>
            <xs:element minOccurs="0"
```

TABLE III-continued

```
name="SCORE_MAX" type="xs:string"/>
                    <xs:element minOccurs="0"
name="SCORE_MIN" type="xs:string"/>
                    <xs:element default="false"
minOccurs="0" name="IS_SYNCHRONIZED" type="xs:string"/>
                    <xs:element default="0"
minOccurs="0" name="LAST_SYNCHRONIZED_ON" type="xs:long"/>
                    <xs:element
default="null_value_rnd_213211223321122121313123123" minOccurs="0"
name="SABA_OBJECT_ID" type="xs:string"/>
                    <xs:element default="0"
minOccurs="0" name="CREATED_ON" type="xs:long"/>
                    <xs:element default="0"
minOccurs="0" name="UPDATED_ON" type="xs:long"/>
                  </xs:sequence>
                </xs:complexType>
              </xs:element>
              <xs:element
name="cnt_cmi_comments_from_learner">
                <xs:complexType>
                  <xs:sequence>
                    <xs:element name="ID"
type="xs:string"/>
                    <xs:element
name="REGISTRATION_ID" type="xs:string"/>
                    <xs:element
name="COMMENT" type="xs:string"/>
                    <xs:element default="false"
minOccurs="0" name="IS_SYNCHRONIZED" type="xs:string"/>
                    <xs:element default="0"
minOccurs="0" name="LAST_SYNCHRONIZED_ON" type="xs:long"/>
                    <xs:element
default="null_value_rnd_213211223321122121313123123" minOccurs="0"
name="SABA_OBJECT_ID" type="xs:string"/>
                    <xs:element default="0"
minOccurs="0" name="CREATED_ON" type="xs:long"/>
                    <xs:element default="0"
minOccurs="0" name="UPDATED_ON" type="xs:long"/>
                  </xs:sequence>
                </xs:complexType>
              </xs:element>
              <xs:element name="cnt_cmi_learner_preference">
                <xs:complexType>
                  <xs:sequence>
                    <xs:element name="ID"
type="xs:string"/>
                    <xs:element
name="REGISTRATION_ID" type="xs:string"/>
                    <xs:element name="AUDIO"
type="xs:string"/>
                    <xs:element name="TEXT"
type="xs:string"/>
                    <xs:element
name="LANGUAGE" type="xs:string"/>
                    <xs:element name="SPEED"
type="xs:string"/>
                    <xs:element default="false"
minOccurs="0" name="IS_SYNCHRONIZED" type="xs:string"/>
                    <xs:element default="0"
minOccurs="0" name="LAST_SYNCHRONIZED_ON" type="xs:long"/>
                    <xs:element
default="null_value_rnd_213211223321122121313123123" minOccurs="0"
name="SABA_OBJECT_ID" type="xs:string"/>
                    <xs:element default="0"
minOccurs="0" name="CREATED_ON" type="xs:long"/>
                    <xs:element default="0"
minOccurs="0" name="UPDATED_ON" type="xs:long"/>
                  </xs:sequence>
                </xs:complexType>
              </xs:element>
              <xs:element name="cnt_cmi_interaction">
                <xs:complexType>
                  <xs:sequence>
                    <xs:element name="ID"
type="xs:string"/>
                    <xs:element
name="SESSION_ID" type="xs:string"/>
                    <xs:element
name="INTERACTION_ID" type="xs:string"/>
                    <xs:element name="TYPE"
```

TABLE III-continued

```
type="xs:string"/>
                                <xs:element name="DATE" type="xs:string"/>
                                <xs:element name="TIME" type="xs:string"/>
                                <xs: element name="CORRECT_RESPONSE" type="xs:string"/>
                                <xs: element name="LEARNER_RESPONSE" type="xs:string"/>
                                <xs:element name="RESULT" type="xs:string"/>
                                <xs:element name="WEIGHTING" type="xs:string"/>
                                <xs:element name="LATENCY" type="xs:string"/>
                                <xs:element name="DESCRIPTION" type="xs:string"/>
                                <xs:element default="false" minOccurs="0" name="IS_SYNCHRONIZED" type="xs:string"/>
                                <xs:element default="0" minOccurs="0" name="LAST_SYNCHRONIZED_ON" type="xs:long"/>
                                <xs:element default="null_value_rnd_213211223211221213123123" minOccurs="0" name="SABA_OBJECT_ID" type="xs:string"/>
                                <xs:element default="0" minOccurs="0" name="CREATED_ON" type="xs:long"/>
                                <xs:element default="0" minOccurs="0" name="UPDATED_ON" type="xs:long"/>
                                <xs:element name="QUESTION_TEXT" type="xs:string"/>
                            </xs:sequence>
                        </xs:complexType>
                    </xs:element>
                    <xs:element name="cnt_cmi_objective">
                        <xs:complexType>
                            <xs:sequence>
                                <xs:element name="ID" type="xs:string"/>
                                <xs:element minOccurs="0" name="REGISTRATION_ID" type="xs:string"/>
                                <xs:element name="OBJECTIVE_ID" type="xs:string"/>
                                <xs:element name="STATUS" type="xs:string"/>
                                <xs:element minOccurs="0" name="SCORE_RAW" type="xs:string"/>
                                <xs:element minOccurs="0" name="SCORE_MAX" type="xs:string"/>
                                <xs:element minOccurs="0" name="SCORE_MIN" type="xs:string"/>
                                <xs:element default="false" minOccurs="0" name="IS_SYNCHRONIZED" type="xs:string"/>
                                <xs:element default="0" minOccurs="0" name="LAST_SYNCHRONIZED_ON" type="xs:long"/>
                                <xs:element default="null_value_rnd_213211223211221213123123" minOccurs="0" name="SABA_OBJECT_ID" type="xs:string"/>
                                <xs:element default="0" minOccurs="0" name="CREATED_ON" type="xs:long"/>
                                <xs:element default="0" minOccurs="0" name="UPDATED_ON" type="xs:long"/>
                            </xs:sequence>
                        </xs:complexType>
                    </xs:element>
                </xs:choice>
            </xs:complexType>
            <xs:unique msdata:PrimaryKey="true" name="Constraint1">
                <xs:selector xpath=".//id_table"/>
                <xs:field xpath="ID"/>
            </xs:unique>
            <xs:unique msdata:ConstraintName="Constraint1" msdata:PrimaryKey="true" name="cnt_cmi_owner_Constraint1">
                <xs: selector xpath=".//cnt_cmi_owner"/>
                <xs:field xpath="ID"/>
            </xs:unique>
            <xs:unique msdata:ConstraintName="Constraint1" msdata:PrimaryKey="true" name="cnt_cmi_package_Constraint1">
                <xs:selector xpath=".//cnt_cmi_package"/>
                <xs:field xpath="ID"/>
            <xs:unique>
```

TABLE III-continued

```
            <xs:unique msdata:ConstraintName="Constraint1"
msdata:PrimaryKey="true" name="cnt_cmi_registration_Constraint1">
                <xs:selector xpath=".//cnt_cmi_registration"/>
                <xs:field xpath="ID"/>
            </xs:unique>
            <xs:unique msdata:ConstraintName="Constraint1"
msdata:PrimaryKey="true" name="cnt_cmi_session_Constraint1">
                <xs:selector xpath=".//cnt_cmi_session"/>
                <xs:field xpath="ID"/>
            </xs:unique>
            <xs:unique msdata:ConstraintName="Constraint1"
msdata:PrimaryKey="true" name="cnt_cmi_comments_from_learner_Constraint1">
                <xs:selector xpath=".//cnt_cmi_comments_from_learner"/>
                <xs:field xpath="ID"/>
            </xs:unique>
            <xs:unique msdata: ConstraintName="Constraint1"
msdata:PrimaryKey="true" name="cnt_cmi_learner_preference_Constraint1">
                <xs:selector xpath=".//cnt_cmi_learner_preference"/>
                <xs:field xpath="ID"/>
            </xs:unique>
            <xs:unique msdata:ConstraintName="Constraint1"
msdata:PrimaryKey="true" name="cnt_cmi_interaction_Constraint"">
                <xs:selector xpath=".//cnt_cmi_interaction"/>
                <xs:field xpath="ID"/>
            </xs:unique>
            <xs:unique msdata:ConstraintName="Constraint1"
msdata:PrimaryKey="true" name="cnt_cmi_objective_Constraint1">
                <xs:selector xpath=".//cnt_cmi_objective"/>
                <xs:field xpath="ID"/>
            </xs:unique>
            <xs:keyref msdata:AcceptRejectRule="Cascade"
msdata:ConstraintOnly="true"
name="Registration.ID_x0020_and_x0020_Objective.REGISTRATION_ID"
refer="cnt_cmi_registration_Constraint1">
                <xs:selector xpath=".//cnt_cmi_objective"/>
                <xs:field xpath="REGISTRATION_ID"/>
            </xs:keyref>
            <xs:keyref msdata:AcceptRejectRule="Cascade"
msdata:ConstraintOnly="true"
name="Session.ID_x0020_and_x0020_Interaction.SESSION_ID"
refer="cnt_cmi_session_Constraint1">
                <xs:selector xpath=".//cnt_cmi_interaction"/>
                <xs:field xpath="SESSION_ID"/>
            </xs:keyref>
            <xs:keyref msdata:AcceptRejectRule="Cascade"
msdata:ConstraintOnly="true"
name="Registration.ID_x0020_and_x0020_earnerPreference.REGISTRATION_ID"
refer="cnt_cmi_registration_Constraint1">
                <xs:selector xpath=".//cnt_cmi_learner_preference"/>
                <xs:field xpath="REGISTRATION_ID"/>
            </xs:keyref>
        <xs:keyref msdata:AcceptRejectRule="Cascade"
msdata:ConstraintOnly="true"
name="Registration.ID_x0020_and_x0020_CommentFromLearner.REGISTRATION_I
D" refer="cnt_cmi_registration_Constraint1">
                <xs:selector xpath=".//cnt_cmi_comments_from_learner"/>
                <xs:field xpath="REGISTRATION_ID"/>
            </xs:keyref>
            <xs:keyref msdata:AcceptRejectRule="Cascade"
msdata:ConstraintOnly="true"
name="Registration.ID_x0020_and_x0020_Session.REGISTRATION_ID"
refer="cnt_cmi_registration_Constraint1">
                <xs:selector xpath=".//cnt_cmi_session"/>
                <xs:field xpath="REGISTRATION_ID"/>
            </xs:keyref>
            <xs:keyref msdata:AcceptRejectRule="Cascade"
msdata:ConstraintOnly="true"
name="Package.ID_x0020_and_x0020_Registration.PACKAGE_ID"
refer="cnt_cmi_package_Constraint1">
                <xs:selector xpath=".//cnt_cmi_registration"/>
                <xs:field xpath="PACKAGE_ID"/>
            </xs:keyref>
            <xs:keyref msdata:AcceptRejectRule="Cascade"
msdata:ConstraintOnly="true"
name="Owner.ID_x0020_and_x0020_Package.OWNER_ID"
refer="cnt_cmi_owner_Constraint1">
                <xs:selector xpath=".//cnt_cmi_package"/>
                <xs:field xpath="OWNER_ID"/>
            </xs:keyref>
        </xs:element>
```

TABLE III-continued

```
        </xs:schema>
        <id_table>
            <ID>1</ID>
            <TABLE_NAME>cnt_cmi_owner</TABLE_NAME>
            <LASTID>1004</LASTID>
        </id_table>
        <id_table>
            <ID>2</ID>
            <TABLE_NAME>cnt_cmi_package</TABLE_NAME>
            <LASTID>1004</LASTID>
        </id_table>
        <id_table>
            <ID>3</ID>
            <TABLE_NAME>cnt_cmi_registration</TABLE_NAME>
            <LASTID>1004</LASTID>
        </id_table>
        <id_table>
        <ID>4</ID>
            <TABLE_NAME>cnt_cmi_session</TABLE_NAME>
            <LASTID>1012</LASTID>
        </id_table>
        <id_table>
            <ID>5</ID>
            <TABLE_NAME>cnt_cmi_comments_from_learner</TABLE_NAME>
            <LASTID>1004</LASTED>
        </id_table>
        <id_table>
            <ID>6</ID>
            <TABLE_NAME>cnt_cmi_learner_preference</TABLE_NAME>
            <LASTID>1004</LASTID>
        </id_table>
        <id_table>
            <ID>7</ID>
            <TABLE_NAME>cnt_cmi_interaction</TABLE_NAME>
            <LASTID>1006<LASTID>
        </id_table>
        <id_table>
            <ID>8<ID>
            <TABLE_NAME>cnt_cmi_objective</TABLE_NAME>
            <LASTID>1000</LASTID>
        </id_table>
        <cnt_cmi_owner>
            <ID>1004</ID>
            <NAME>oneau - offline</NAME> <PART_NO/>
            <IS_SYNCHRONIZED>false</IS_SYNCHRONIZED>
            <LAST_SYNCHRONIZED_ON>0</LAST_SYNCHRONIZED_ON>
            <SABA_OBJECT_ID>cninv000000000001455</SABA_OBJECT_ID>
            <CREATED_ON>632663626070000000</CREATED_ON>
            <UPDATED_ON>632663626129062500</UPDATED_ON>
        </cnt_cmi_owner>
        <cnt_cmi_package>
            <ID>1004</ID>
            <OWNER_ID>1004</OWNER_ID>
            <EMPLOYEE_SABA_ID>emplo000000000001000</EMPLOYEE_SABA_ID>
            <EMPLOYEE_USERNAME>uone</EMPLOYEE_USERNAME>
            <EMPLOYEE_FULL_NAME>UserOne</EMPLOYEE_FULL_NAME>
            <EMPLOYEE_CULTURE>en_US</EMPLOYEE_CULTURE>
            <CONTEXT_ID>ctctx000000000001215</CONTEXT_ID>
            <SUBSCRIPTION_ID>ctnsr000000000001223</SUBSCRIPTION_ID>
            <REGISTRATION_ID>I_A001</REGISTRATION_ID>
            <NAME>oneau - offline</NAME>
            <DOWNLOADED_ON>10/31/2005</DOWNLOADED_ON>
            <FOLDER>632663626061406250</FOLDER>
<CALLBACK_URL>http://runni:80/Saba/AICCReporter?aiccSessionKey=dcert313038
66336338643539625E235E756F6E655E235E53616261536974655E235E656E5F55535
E235E536162615E235E53414241302C021427293F991416C9A57D119E19C82CE10A
8F3CD44202145AE9C8681AB1E40EAFE4E12E02312970498C0EFD-
content/cmiHACP.saba&session_id=cninv000000000001455&userId=uone&a
mp;content-type=SabaOffline</CALLBACK_URL>
            <IS_SYNCHRONIZED>true</IS_SYNCHRONIZED>
            <LAST_SYNCHRONIZED_ON>0</LAST_SYNCHRONIZED_ON>
        <SABA_OBJECT_ID>null_value_rnd_213211223211221213123123</SABA_O
BJECT_ID>
            <CREATED_ON>632663626070625000</CREATED_ON>
            <UPDATED_ON>632663626129062500</UPDATED_ON>
        </cnt_cmi_package>
        <cnt_cmi_registration>
            <ID>1004</ID>
            <PACKAGE_ID>1004</PACKAGE_ID>
            <ACTIVITY_ID>I_A001</ACTIVITY_ID>
```

TABLE III-continued

```
        <LESSON_STATUS>passed</LESSON_STATUS>
        <CREDIT>credit<CREDIT>
        <ENTRY>ab-initio</ENTRY>
        <EXIT>logout</EXIT>
        <LOCATION/>
        <MODE>normal</MODE>
        <SUSPEND_DATA/>
        <TOTAL_TIME>00:02:58</TOTAL_TIME>
        <SCORE_RAW>100</SCORE_RAW>
        <SCORE_MAX/>
        <SCORE_MIN/>
        <TOTAL_ATTEMPTS>5</TOTAL_ATTEMPTS>
        <IS_SYNCHRONIZED>true</IS_SYNCHRONIZED>
        <LAST_SYNCHRONIZED_ON>0</LAST_SYNCHRONIZED_ON>
        <SABA_OBJECT_ID>aireg000000000001404</SABA_OBJECT_ID>
        <CREATED_ON>632663626070781250</CREATED_ON>
        <UPDATED_ON>632663626489531250</UPDATED_ON>
    </cnt_cmi_registration>
    <cnt_cmi_session>
        <ID>1012</ID>
        <REGISTRATION_ID>1004</REGISTRATION_ID>
        <ATTEMPT_NUMBER>1</ATTEMPT_NUMBER>
        <LESSON_STATUS>passed</LESSON_STATUS>
        <TIME>00:00:22</TIME>
        <SCORE_RAW>100</SCORE_RAW>
        <SCORE_MAX/> <SCORE_MIN/>
        <IS_SYNCHRONIZED>true</IS_SYNCHRONIZED>
        <LAST_SYNCHRONIZED_ON>0<LAST_SYNCHRONIZED_ON>
        <SABA_OBJECT_ID>aises000000000002284</SABA_OBJECT_ID>
        <CREATED_ON>632663626129062500</CREATED_ON>
        <UPDATED_ON>632663626489531250</UPDATED_ON>
    </cnt_cmi_session>
    <cnt_cmi_comments_from_learner>
        <ID>1004</ID>
        <REGISTRATION_ID>1004<REGISTRATION_ID>
        <COMMENT/>
        <IS_SYNCHRONIZED>true</IS_SYNCHRONIZED>
        <LAST_SYNCHRONIZED_ON>0</LAST_SYNCHRONIZED_ON>
    <SABA_OBJECT_ID>null_value_rnd_213211223211221213123123</SABA_OBJECT_ID>
        <CREATED_ON>632663626250000000</CREATED_ON>
        <UPDATED_ON>632663626489218750</UPDATED_ON>
    </cnt_cmi_comments_from_learner>
    <cnt_cmi_learner_preference>
        <ID>1004</ID>
        <REGISTRATION_ID>1004</REGISTRATION_ID>
        <AUDIO>0</AUDIO>
        <TEXT>0</TEXT>
        <LANGUAGE/>
        <SPEED>0</SPEED>
        <IS_SYNCHRONIZED>true</IS_SYNCHRONIZED>
        <LAST_SYNCHRONIZED_ON>0</LAST_SYNCHRONIZED_ON>
    <SABA_OBJECT_ID>null_value_rnd_213211223211221213123123</SABA_OBJECT_ID>
        <CREATED_ON>632663626250000000</CREATED_ON>
        <UPDATED_ON>632663626489218750</UPDATED_ON>
    </cnt_cmi_learner_preference>
    <cnt_cmi_interaction>
        <ID>1005</ID>
        <SESSION_ID>1012</SESSION_ID>
        <INTERACTION_ID>Question_2_49</INTERACTION_ID>
        <TYPE>choice</TYPE>
        <DATE>10/31/2005</DATE>
        <TIME>13:37:28</TIME>
        <CORRECT_RESPONSE/>
        <LEARNER_RESPONSE>A</LEARNER_RESPONSE>
        <RESULT>correct<RESULT>
        <WEIGHTING/>
        <LATENCY>00:00:02</LATENCY>
        <DESCRIPTION/>
        <IS_SYNCHRONIZED>false</IS_SYNCHRONIZED>
        <LAST_SYNCHRONIZED_ON>0</LAST_SYNCHRONIZED_ON>
    <SABA_OBJECT_ID>null_value_md_213211223211221213123123</SABA_OBJECT_ID>
        <CREATED_ON>632663626463437500</CREATED_ON>
        <UPDATED_ON>632663626489531250</UPDATED_ON>
        <QUESTION_TEXT>Choose one.</QUESTION_TEXT>
    </cnt_cmi_interaction>
    <cnt_cmi_interaction>
        <ID>1006</ID>
```

TABLE III-continued

```
<SESSION_ID>1012</SESSION_ID>
<INTERACTION_ID>Question_1_48<INTERACTION_ID>
<TYPE>true-false<TYPE>
<DATE>10/31/2005</DATE>
<TIME>13:37:28</TIME>
<CORRECT_RESPONSE/>
<LEARNER_RESPONSE>1</LEARNER_RESPONSE>
<RESULT>correct</RESULT>
<WEIGHTING/>
<LATENCY>00:00:04</LATENCY>
<DESCRIPTION/>
<IS_SYNCHRONIZED>false</IS_SYNCHRONIZED>
<LAST_SYNCHRONIZED_ON>0</LAST_SYNCHRONIZED_ON>
<SABA_OBJECT_ID>null_value_rnd_213211223211221213123123</SABA_OBJECT_ID>
<CREATED_ON>632663626463437500</CREATED_ON>
<UPDATED_ON>632663626489531250</UPDATED_ON>
<QUESTION_TEXT>Is true or false?</QUESTION_TEXT>
</cnt_cmi_interaction>
```

Table III above contains the schema for storing the results as well as the actual results. The schema contains the various representations of the business objects that are needed to store the result information in accordance with embodiments of the invention. Below are exemplary business objects in accordance with embodiments of the present invention.

cnt_cmi_owner—This is a representation for owner of each of the packages imported in the player. The various elements are—
- id—a unique identifier for each entry
- name—name of the package
- part_no—not used currently
- is_synchronized—Boolean value for whether the data has been synchronized with Saba
- last_synchronized_on—the date when results were last synchronized with Saba
- saba_object_id—id of the content inventory
- created_on—date of creation of this entry
- updated_on—date when this entry was last updated cnt_cmi_package—This is a representation of each of the packages imported in the player. The various elements are—
- id—a unique identifier for each entry
- owner_id—points to the owner of the package in cnt_cmi_owner
- employee_saba_id—id of the user
- employee_username—unique identifier for the user
- employee_full_name—Full name of the user
- employee_culture—locale of the user
- context_id—This is the id of the context business object. The context in which the content is accessed by the user. It encapsulates the user and the source from which s/he gets the access to the content subscription_id—this is the id of the subscription object. Subscription defines the process of subscribing to a content. This object holds information about the content and the subscriber.
- registration_id—not used currently
- name—name of the content package
- downloaded_on—date on which the package was downloaded
- folder—folder name on the system where the content has been downloaded
- callback_url—URL used to synchronize results of this content package with Saba
- is_synchronized—Boolean value for whether the data has been synchronized with Saba
- last_synchronized_on—date on which the data was last synchronized with Saba
- saba_object_id—id of the content inventory
- created_on—date of creation of this entry
- updated_on—date when this entry was last updated cnt_cmi_registration—This is a representation of student's run-time data for an AU or SCO in the content that represents the [Core] group of the CMI data model.
Saba specific elements are—
- id—a unique identifier for each entry
  - package_id—pointer to the corresponding id in cnt_cmi_package
  - activity_id—identifier of the current activity in a SCO
  - total_attempts—total attempts of all the student's sessions in the SCO
  - is_synchronized—Boolean value for whether the data has been synchronized with Saba
  - last_synchronized_on—date on which the data was last synchronized with Saba
  - saba_object_id—id of the content inventory
  - created_on—date of creation of this entry
  - updated_on—date when this entry was last updated The following is the list of SCORM specific elements.
- lesson_status—current student status
- credit—indicates whether the SCO is for credit
- entry—indication of whether the student has been in the SCO before
- exit—an indication of how or why the student left the SCO.
- location—identifies the student's exit point which can be used by the SCO as an entry point the next time the student runs the SCO
- mode—identifies the SCO behavior desired after launch
- suspend_data—represents the [Core_Lesson] group of the CMI data model. Stored information from previous launch of the SCO which can be used in the current launch.
- total_time—total time of all the student's sessions in the SCO
- score_raw—raw score
- score_max—the maximum score that can be achieved in the SCO
- score_min—the minimum score that can be achieved in the SCO cnt_emi_session—This is a representation of student's run-time data representing the [Core] group of CMI data model for the single session.

Saba specific elements are—
Id—a unique identifier for each entry
registration_id—pointer to the corresponding entry in cnt_cmi_registration
attempt_number—an integer value representing the current attempt
is_synchronized—Boolean value for whether the data has been synchronized with Saba
last_synchronized_on—date on which the data was last synchronized with Saba
saba_object_id—id of the content inventory
created_on—date of creation of this entry
updated_on—date when this entry was last updated
The following is the list of SCORM specific elements.
lesson_status—student status for the current attempt
time—time the student has spent in the SCO.
score_raw—raw score for the current attempt
score_max—the maximum score that the student could have achieved in the current attempt
score_min—the minimum score that the student could have achieved in the current attempt cnt_cmi_comments_from_learner—This represents learner and LMS comments for a SCO.
Saba specific elements are—
Id—a unique identifier for each entry
registration_id—pointer to the corresponding entry in cnt_cmi_registration
is_synchronized—Boolean value for whether the data has been synchronized with Saba
last_synchronized_on—date on which the data was last synchronized with Saba
saba_object_id—id of the content inventory
created_on—date of creation of this entry
updated_on—date when this entry was last updated
The following is the list of SCORM specific elements.
comment—actual comment cnt_cmi_learner_preference—This is a representation of the [Student_Preferences] group of the CMI data model.
Saba specific elements are—
Id—a unique identifier for each entry
registration_id—pointer to the corresponding entry in cnt_cmi_registration
is_synchronized—Boolean value for whether the data has been synchronized with Saba
last_synchronized_on—date on which the data was last synchronized with Saba
saba_object_id—id of the content inventory
created_on—date of creation of this entry
updated_on—date when this entry was last updated
The following is the list of SCORM specific elements.
Audio—indicator of the audio volume level or audio on-off.
Text—identifies whether the audio text appears in the SCO
Language—the language in which the content is delivered
Speed—Indicator for the speed of the lesson flow cnt_cmi_interaction—This is a representation of recognized and recordable input or group of inputs from the student.
Saba specific elements are—
Id—a unique identifier for each entry
session_id—pointer to owner entry in cnt_cmi_session
date—date when the interaction was recorded
description—stores the interaction question text
is_synchronized—Boolean value for whether the data has been synchronized with Saba
last_synchronized_on—date on which the data was last synchronized with Saba
saba_object_id—id of the content inventory
created_on—date of creation of this entry
updated_on—date when this entry was last updated
question_text—stores the interaction question text
The following is the list of SCORM specific elements.
interaction_id—unique identifier for an interaction
type—the type of interaction. Possible values are specified in the CMI data model doe
time—time when the interaction took place.
correct_response—correct response(s) for the interaction
learner_response—learner response(s) for the interaction
result—actual result from the learner's response
weighting—identifies the importance of an interaction
latency—time spent by the learner to complete the interaction cnt_cmi_objective—This is a representation of the [Objectives_Status] group of the CMI data model.
Saba specific elements are—
Id—a unique identifier for each entry
registration_id—each objective is captured per registration. This is a pointer to the corresponding entry in cnt_cmi_registration
is_synchronized—Boolean value for whether the data has been synchronized with Saba
last_synchronized_on—date on which the data was last synchronized with Saba
saba_object_id—id of the content inventory
created_on—date of creation of this entry
updated_on—date when this entry was last updated
The following is the list of SCORM specific elements.
objective_id—an internal identifier of the objective
status—status of the objective for a learner
score_raw—numerical score for an objective
score_max—maximum score that can be achieved for an objective
score_min—minimum score that can be achieved for an objective Embodiments of the present invention, a system and method for SCORM-based offline player processing and interaction have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:
1. A method comprising:
receiving content at a first computer system that is downloaded from a second computer, wherein said first computer system comprises:
a content player, which is operable to play said content; and one or more non-transitory memories, at least one of which comprises a web browser program stored therewith, wherein said web browser program is operable to access an initial content player download web page and wherein said installation of said content player is performed in response to an action of said first computer system in relation to said initial content player download web page;

accessing, with said first computer system, a portion of said content for a first user;

playing said portion of said content on said first computer system using said content player, wherein said content player performs said playing without a function of said web browser and with said first computer system offline in relation to a communicative coupling with said second computer system;

storing results associated with said playing said portion of said content in one or more of said one or more memories of said first computer system with said first computer system offline in relation to said communicative coupling with said second computer system, said results comprising information uniquely associating said results with said first user;

uploading said stored results to said second computer system in response to detecting a connection between said first computer system and said second computer system, wherein upon said connection said first computer system is online in relation to said communicative coupling with said second computer system;

receiving, from said second computer system, an update to said content in response to said uploading;

updating said content based on said update; and determining a portion of the updated content for playing on said first computer system based on said information about said first user included with said stored results.

2. The method as described in claim 1, wherein said content is substantially Sharable Courseware Object Reference Model (SCORM) compatible.

3. The method as described in claim 1 further comprising:
in response to detecting said first computer system is online, updating a training transcript associated with said first computer system.

4. The method as described in claim 1 further comprising:
in response to detecting said first computer system is online, automatically uploading updates associated with said content.

5. The method as described in claim 1, wherein said content player is a generic offline player.

6. The method as described in claim 1 further comprising:
configuring user interface controls associated with said content player.

7. The method as recited in claim 1 wherein said initial content player download webpage comprises a link, which points to a downloadable instance of said content player and wherein said action of said first computer system in relation to said initial content player web page comprises said first computer system activating said link.

8. The method as described in claim 1, further comprising:
accessing, with said first computer system, a second portion of said content for a second user;
playing said second portion of said content on said first computer system using said content player; and
storing second results associated with said playing said second portion of said content in one or more of said one or more memories of said first computer system, said second results comprising information uniquely associating said second results with said second user.

9. The method as described in claim 1, further comprising:
accessing, via a third computer system in communication with said first computer system, a second portion of said content for a second user;
playing said second portion of said content on said third computer system using a content player on said third computer system;
storing second results associated with said playing said second portion of said content in one or more of said one or more memories of said third computer system, said second results comprising information uniquely associating said second results with said second user; and
uploading said stored second results to said second computer system.

10. The method as described in claim 1, wherein when said content is downloaded from said second computer system, said second computer system adds a unique file to a download package that includes said content player, said content, and an uploader that performs said uploading said stored results to said second computer system.

11. A method comprising:
receiving and installing a content player at a first computer system, wherein installation of said content player on said first computer system is performed prior to receiving content at said first computer system, wherein said first computer system comprises one or more non-transitory memories, at least one of which comprises a web browser program stored therewith, wherein said web browser program is operable to access an initial content player download web page and wherein said installation of said content player is performed in response to an action of said first computer system in relation to said initial content player download web page, said content player operable for playing content on said first computer system;

receiving said content at said first computer system;

playing at least a portion of said content on said first computer system using said content player, wherein said first computer is optionally online and is otherwise offline in relation to a second computer system, wherein said content player performs said playing at least said portion without a function of said web browser;

upon said playing said portion of said content, wherein said playing said portion is performed while said first computer is offline in relation to said communicative coupling with said second computer, storing results associated with said playing said portion in one or more of said one or more memories of said first computer system to produce stored offline play results, said stored offline play results comprising information uniquely associating said results with a first user;

sending said stored offline play results from said first computer system to said second computer system in response to said first computer system connecting to said second computer system wherein, upon said connecting, said first computer system is online in relation to said communicative coupling with said second computer system;

automatically receiving, at said first computer system, an update to said content upon receiving said stored offline play results from said first computer system; and determining a portion of the updated content for playing on said first computer system based on said information about said first user included with said stored offline play results.

12. The method as described in claim 11, further comprising:
   determining a subsequent play pattern of said content based on said offline play results.

13. The method as described in claim 11, further comprising:
   accessing, with said first computer system, a second portion of said content for a second user;
   playing said second portion of said content on said first computer system using said content player; and
   storing second results associated with said playing said second portion of said content in one or more of said one or more memories of said first computer system, said second results comprising information uniquely associating said second results with said second user.

14. The method as described in claim 11, further comprising:
   accessing, via a third computer system in communication with said first computer system, a second portion of said content for a second user;
   playing said second portion of said content on said third computer system using a content player on said third computer system;
   storing second results associated with said playing said second portion of said content in one or more of said one or more memories of said third computer system, said second results comprising information uniquely associating said second results with said second user; and
   uploading said stored second results to said second computer system.

15. A first computer system for offline web-based training comprising:
   a first component operable for initially downloading a content player to said first computer system, wherein said content player is operable for playing content on said first computer system while said first computer system is optionally online or offline in relation to a communicative coupling with a second computer system, and wherein said content player, upon said initially downloading, is installed on said first computer system, and wherein said installation of said content player on said first computer system is performed prior to said content player playing said content on said first computer system;
   wherein said first computer system comprises one or more non-transitory memories, at least one of which comprises a web browser program stored thereon, wherein said first component is operable with said web browser program, which functions to access an initial content player download web page and wherein said initially downloading said content player is performed in response to an action of said first computer system in relation to said initial content player download web page wherein, upon said initially downloading thereof, said content player performs said playing without a function of said web browser program;
   a second component operable to download said content to said first computer system;
   a third component operable to automatically upload stored results associated with off-line play of at least a portion of said content, to said second computer system in response to detecting a connection between said first computer system and said second computer system, said stored results comprising information uniquely associating said stored results with a first user, wherein offline play is performed when said first computer system is offline and, upon said connection, said first computer is online, in relation to said communicative coupling, wherein one or more of said second component or said third component are further operable for:
      receiving, from said second computer system, an update to said content upon an automatic distribution thereof by said second computer system in response to said uploading; and
      updating said content based on said receiving said update; and
   a fourth component operable to determine a portion of said content for off-line play based on said information about said first user included with said stored results.

16. The first computer system as described in claim 15 further comprising:
   a fifth component operable to store said results of said offline play wherein said fifth component is related to one or more of said one or more memories.

17. The first computer system as described in claim 15, wherein said first component is further operable to automatically download updates associated with said content player to said first computer system in response to detecting said connection between said first computer system and said second computer system.

18. The first computer system as described in claim 15, wherein said second component is further operable to automatically download second content to said first computer system in response to detecting said connection between said first computer system and said second computer system.

19. The first computer system as described in claim 15, further operable to access a second portion of said content for a second user; play said second portion of said content on said first computer system using said content player; and store second results associated with playing said second portion of said content in one or more of said one or more memories of said first computer system, said second results comprising information uniquely associating said second results with said second user.

20. The first computer system as described in claim 15, further operable to provide a second portion of said content for a second user to a third computer system in communication with said first computer system; wherein said second portion of said content is played on said third computer system using a content player on said third computer system, said third computer system then storing second results associated with said playing said second portion of said content in one or more of said one or more memories of said third computer system, said second results comprising information uniquely associating said second results with said second user, and said third computer system also uploading said stored second results to said second computer system.

* * * * *